United States Patent
Ronnewinkel (10) Patent No.: US 8,370,166 B2
(45) Date of Patent: Feb. 5, 2013

(54) SCRIPT-BASED INFORMATION RETRIEVAL

(75) Inventor: Christopher Ronnewinkel, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 2179 days.

(21) Appl. No.: 10/868,139

(22) Filed: Jun. 15, 2004

(65) Prior Publication Data

US 2005/0278207 A1 Dec. 15, 2005

(51) Int. Cl.
*G06F 17/30* (2006.01)
*H02H 3/05* (2006.01)

(52) U.S. Cl. ................................ 705/1.1; 707/3; 707/10

(58) Field of Classification Search .................. 705/1, 8; 707/10, 3; 1/1
See application file for complete search history.

(56) References Cited

U.S. PATENT DOCUMENTS

| | | | |
|---|---|---|---|
| 5,924,090 A | 7/1999 | Krellenstein | |
| 6,269,361 B1 | 7/2001 | Davis et al. | |
| 6,377,944 B1 * | 4/2002 | Busey et al. | 707/3 |
| 6,477,531 B1 * | 11/2002 | Sullivan et al. | 1/1 |
| 6,490,577 B1 | 12/2002 | Anwar | |
| 7,076,456 B1 * | 7/2006 | Rofrano | 705/27 |
| 2002/0107842 A1 | 8/2002 | Biebesheimer et al. | |
| 2003/0225747 A1 * | 12/2003 | Brown et al. | 707/3 |
| 2004/0068486 A1 * | 4/2004 | Chidlovskii | 707/3 |
| 2004/0073866 A1 * | 4/2004 | Kunzel | 715/500 |
| 2005/0278340 A1 * | 12/2005 | Rehberg et al. | 707/10 |

FOREIGN PATENT DOCUMENTS

| | | |
|---|---|---|
| WO | 01/42880 A2 | 6/2001 |
| WO | 01/67225 | 9/2001 |

OTHER PUBLICATIONS

U.S. Appl. No. 10/327,692, filed Dec. 20, 2002, Lueckhoff et al., dated Apr. 29, 2004.
U.S. Appl. No. 10/365,671, filed Feb. 12, 2003, Wu et al., dated Apr. 29, 2004.
"User documentation for SAP's earlier version of scripting," Written by SAP CRM Documentation Group, Published in Aug. 2000, 6 pgs.
SAP CRM 2.0C IIA Search Document, Jan. 2001, 1 pg.
SAP Labs, Inc., "Specification Distributed Intelligent Agent, Version 1.2," Sep. 14, 1999, ps. 11-15, 18-19, 25-31, 41-42, 47-50, 52-62.

* cited by examiner

*Primary Examiner* — Jami A Plucinski
*Assistant Examiner* — Kimberly Evans
(74) *Attorney, Agent, or Firm* — Fish & Richardson P.C.

(57) ABSTRACT

One implementation provides a method for providing a solution to a problem durring an interaction. In this implementation, the method includes displaying to the user a first question and possible answers to the first question in a graphical user interface (GUI) upon identification of the problem. Each possible answer to the first question is associated with an electronic document stored in a first knowledge base. The method further includes receiving input from the user selecting one of the displayed answers to the first question during the interaction. In response to receiving this input, a name of the electronic document is displayed within the GUI. The electronic document whose name is displayed is associated with the selected answer to the first question and that provides a solution to the problem.

20 Claims, 8 Drawing Sheets

SCRIPT-BASED INFORMATION RETRIEVAL

TECHNICAL FIELD

This description relates to script-based information retrieval in computing systems.

BACKGROUND

In today's business society, customer relations and customer satisfaction are critical for successful and profitable operations. Customers are purchasing various products and services from a variety of providers and using various purchase means. Some customers may make their purchases in person, while others may do so over the telephone. Additionally, the increased use of the Internet as a transaction venue has increased the number of customers who make purchases online.

When customers purchase various products and services, they often have questions, concerns, or complaints that relate to their purchases. For example, a customer who has purchased a printer may have questions about how to use certain printing features, or may submit a complaint regarding a problem with their printer. A customer who has purchased service connectivity from an Internet Service Provider (ISP) may have questions about pricing options, or may have complaints concerning modem connectivity. To maximize customer satisfaction, businesses must be capable of responding quickly and effectively to customer questions, concerns, or complaints.

Many businesses employ customer care agents who are responsible for interacting with customers. These agents may interact with customers personally or over the telephone. More recently, many customer care agents engage in interactive chat sessions with customers over the Internet. These chat sessions allow agents to communicate quickly and easily with customers all over the world.

When such agents interact with customers, they often need to be able to address a wide variety of questions and provide detailed and effective answers. To do so, the agents often require additional information and/or assistance. As customer care centers have evolved, more and more customer care agents have been able to utilize on-line repositories for obtaining information. These repositories often contain valuable information relating to products and services. This information provides the agents with a means to assist their customers and provide valuable feedback.

Many of these repositories, however, contain an abundance of information. Often, customer care agents have a very difficult time sifting through these repositories to find the most pertinent and valuable information. In addition, in those situations in which businesses allow customers to directly search the repositories for answering their questions and concerns, the same issues arise—customers often cannot find what they want or the solutions they need.

SUMMARY

Various implementations are provided herein. One implementation provides a method for providing a solution to a problem during an interaction. In this implementation, the method includes displaying to the user a first question and possible answers to the first question in a graphical user interface (GUI) upon identification of the problem. Each possible answer to the first question is associated with an electronic document stored in a first knowledge base. The method further includes receiving input from the user selecting one of the displayed answers to the first question during the interaction. In response to receiving this input, a name of the electronic document is displayed within the GUI. The electronic document whose name is displayed is associated with the selected answer to the first question and that provides a solution to the problem.

The details of one or more implementations are set forth in the accompanying drawings and the description below. Other features, objects, and advantages will be apparent from the description and drawings, and from the claims.

DETAILED DESCRIPTION

Figure 1:
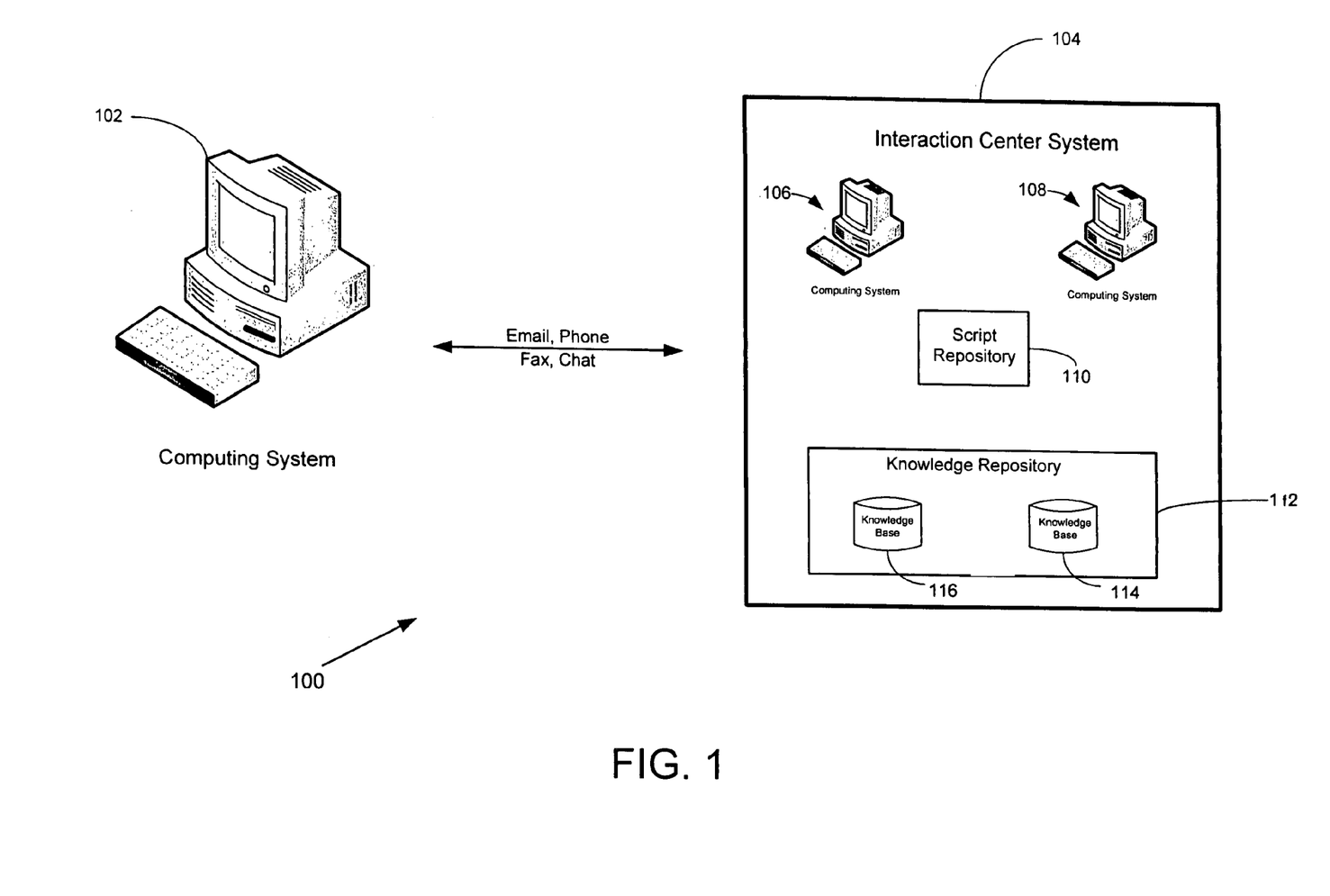
FIG. 1 is a block diagram of a system that may be used to diagnose a problem identified during an interaction between an agent and a customer, according to one implementation.

FIG. 1 is a block diagram of a system 100 that may be used for providing a solution to a problem conveyed by a customer to an agent during an interaction, according to one implementation. In this implementation, the customer interacts with the agent during an interactive session. For example, the customer may engage in an interactive telephone or chat session with a call-center agent to ask for help with a problem that the customer has previously identified and conveyed to the agent during the interaction. The customer uses a computing system 102 to interact with the agent. The agent uses a computing system 106 or 108 within an interaction center system 104. During an interaction with the customer, the agent may use a script that is stored within a script repository 110 to assist the agent when searching for information in a knowledge repository 112 that can help provides a solution to the customer's problem. A script typically includes a set of predefined questions and a set of potential answers that are associated with each question. The script assists the agent in locating information within a knowledge base, such as a knowledge base 114 or 116, contained within the knowledge repository 112. When the agent provides answers to questions presented by the script, a list of search results is provided. Each result corresponds to an electronic document contained in the knowledge base 114 or 116 that provides a solution to the problem. The agent is able to pick one of the search results to retrieve a corresponding electronic document or may alternatively continue to answer additional questions presented by the script to narrow the list of results. A narrowed set of results may provide more detailed and/or tailored solutions to the problem.

In FIG. 1, the customer may interact with the agent in the interaction center system 104 using various different modes of communication. For example, the customer may use the computing system 102 to communicate with the agent in the interaction center system 104 by email, fax, or phone. Alternatively, the customer may engage in an interactive chat session with the agent. When using the computing system 106 or 108, the agent is able to respond to the customer using these and other modes of communication. In one implementation, the computing systems 102, 106, and 108 contain the computing device 500 shown in FIG. 5. In one implementation, the customer initiates the interaction with the agent by generating a request that is sent from the computing system 102 to the interaction center system 104. In one implementation, the interaction center system 104 contains a server management system (not shown) that interacts with each agent computing system 106 and 108. In this implementation, the server management system helps manage and oversee the interaction between the customer computing system 102 and the agent computing systems 106 and 108. The agent computing systems 106 and 108 may continually interact with the server management system during the course of any given interaction.

In one implementation, the knowledge bases 114 and 116 contain electronic documents and the script repository 110 contains scripts. Each script has a set of questions and a set of answers associated with each question, and each answer in the script is associated with one or more electronic documents contained within the knowledge base 114 and/or 116. In one implementation, each question is a closed-ended question having a predefined number of possible answers. In one implementation, one question may be an open-ended question. However, in this implementation, the agent needs to select one of a set of predefined possible answers upon receiving feedback from the customer. The agent may select the answer that appears to match up best with the feedback received from the customer. Each predefined answer is associated with a electronic document that is contained within the knowledge base 114 or 116 and that provides a solution the problem identified by the customer.

The agent reads the questions contained within the script to the customer during the interaction. When the agent asks an individual question to the customer and obtains an answer that is registered with the computing system 106 or 108, the computing system 106 or 108 displays to the agent the names of the electronic documents contained within the knowledge base 114 and/or 116 that are associated with the answer obtained by the agent. In this fashion, the agent is able to use the script to search for information within the knowledge repository 112. The agent may obtain the answer to the question asked by waiting to receive feedback from the customer.

In one implementation, the computing systems 106 and 108 are each coupled to the script repository 110 within the interaction center system 104. The computing systems 106 and 108 are also each coupled to the knowledge bases 114 and 116 within the knowledge repository. As such, the computing systems 106 and 108 are able to directly access both scripts within the script repository 110 and information within the knowledge base 114 and/or 116. In one implementation, the script repository 110 is directly coupled to the knowledge bases 114 and 116. In this implementation, the script repository 110 is capable of directly accessing information within the knowledge base 114 and/or 116.

In one implementation, the interaction center system 104 includes a self-service system that is coupled to the computing system 102 using a network connection, such as an Internet connection. In this implementation, a user of the computing system 102 is able to use the self-service system during an interaction to obtain automated assistance in solving particular problems. The computing systems 106 and 108 are server stations in this implementation, and they are capable of interacting with the computing system 102 in an automated fashion. The user of the computing system 102 uses the self-service system by entering one or more search terms or search attributes to obtain assistance in solving a particular problem. The computing system 106 and/or 108 analyze these search terms or attributes to automatically access a script from the script repository 110 and sends information relating to diagnosis questions to the computing system 102 using the network connection. The computing system 102 is then capable of displaying these questions to the user in a graphical user interface (GUI). When the user selects answers to these questions, information relating to the answers is sent back to the computing system 106 and/or 108 for processing. The answers are associated with electronic documents stored in the knowledge repository 112. The computing system 106 and/or 108 compiles a list of search results that is provided to the computing system 102. Each result corresponds to an electronic document contained in the knowledge base 114 or 116 that provides a solution to the problem specified by the user of the computing system 102. The user of the computing system 102 is able to pick one of the search results to retrieve a corresponding electronic document or may alternatively continue to answer additional questions presented by the script to narrow the list of results. A narrowed set of results may provide more detailed and/or tailored solutions to the problem.

Figure 2:
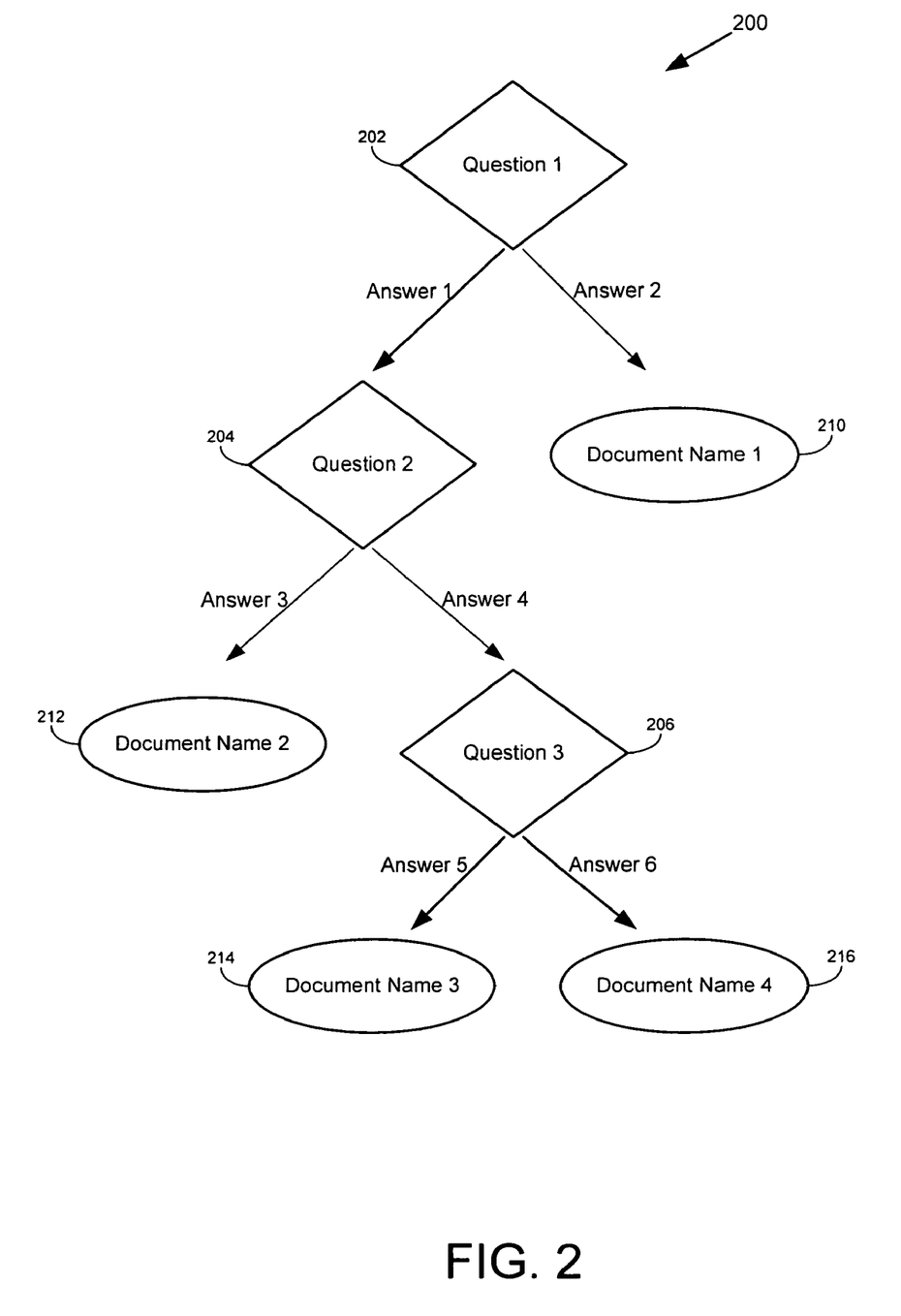
FIG. 2 is a diagram of a script model, according to one implementation.

FIG. 2 is a diagram of a script model 200, according to one implementation. Scripts that are contained within the script repository 110 shown in FIG. 1 may conform to the format shown by the script model 200. The script model 200 includes a set of questions, answers, and electronic document names. Each answer is associated with a given question, and each electronic document name is associated with a given answer. The electronic documents are stored within one of the knowledge bases of the knowledge repository 112, such as the knowledge base 114 or 116. In one implementation, the script model 200 includes copies of the electronic documents that are stored within knowledge base 114 or 116 rather than the names to these documents.

As shown in FIG. 2, the script model 200 includes questions 202, 204, 206 and document names 210, 212, 214, 216. The first question in the script model 200 is the question 202. During an interactive session with a customer, an agent could ask the question 202 to the customer as it is displayed on the computing system 106 or 108. Alternatively, in a self-service system, the question 202 is directly displayed to a user of the computing system 102. The script model 200 shows that there are two potential answers "Answer 1" and "Answer 2" that are associated with the question 202. In one implementation, these answers are predefined by a script administrator. In one implementation, the answers can be modified over time as a result of feedback received from customers over various different interactive sessions. In one implementation, the agent reads the question 202 and the potential answers "Answer 1" and "Answer 2" to the customer before receiving any feedback from the customer.

If the customer provides the answer "Answer 2" to the question 202, the document name 210 is displayed on the computing system 106 or 108, according to one implementation. In one implementation that utilizes that self-service system, the answer is sent from the computing system 102 to the computing system 106 and/or 108. The document name 210 is listed as the only search result corresponding to "Answer 2". The agent or the customer may select the document name 210 to obtain a copy of the corresponding document from the knowledge base 114 or 116. To achieve this, the computing system 106 or 108 sends a direct request to the knowledge repository 112.

If the customer provides the answer "Answer 1" to the question 202, the question 204 is displayed. The agent may then ask the question 204 to the customer during the interactive session, or the question 204 may alternatively be displayed to the customer on the computing system 102. If the customer provides the answer "Answer 3" to the question 204, the document name 212 is displayed. The agent or the customer may select the document name 212 to obtain a copy of the corresponding document from the knowledge base 114 or 116.

If the customer provides the answer "Answer 4" to the question 204, the question 206 is displayed. The agent may then ask the question 206 to the customer during the interactive session, or the question 206 may alternatively be displayed to the customer on the computing system 102. If the customer provides the answer "Answer 5" to the question 206, the document name 214 is displayed. The agent or the customer may select the document name 214 to obtain a copy of the corresponding document from the knowledge base 114 or 116. If, on the other hand, the customer provides the answer "Answer 6" to the question 206, the document name 216 is displayed. The agent or the customer may select the document name 216 to obtain a copy of the corresponding document from the knowledge base 114 or 116.

In one implementation, each of the document names 212, 214, and 216 are displayed to the agent on the computing system 106 or 108 after the customer has provided an answer of "Answer 1" to the question 202. As shown in FIG. 2, each of these document names are associated with answers that depend on "Answer 1" being provided in response to the question 202.

In one implementation, various experts may help define the structure of the script model 200. In this implementation, these experts can help determine which documents are associated with the various questions and answers in the model 200. When the agent uses a script that is based upon the model 200, he or she can benefit from the expert knowledge that has been incorporated into the model 200.

Figure 3:
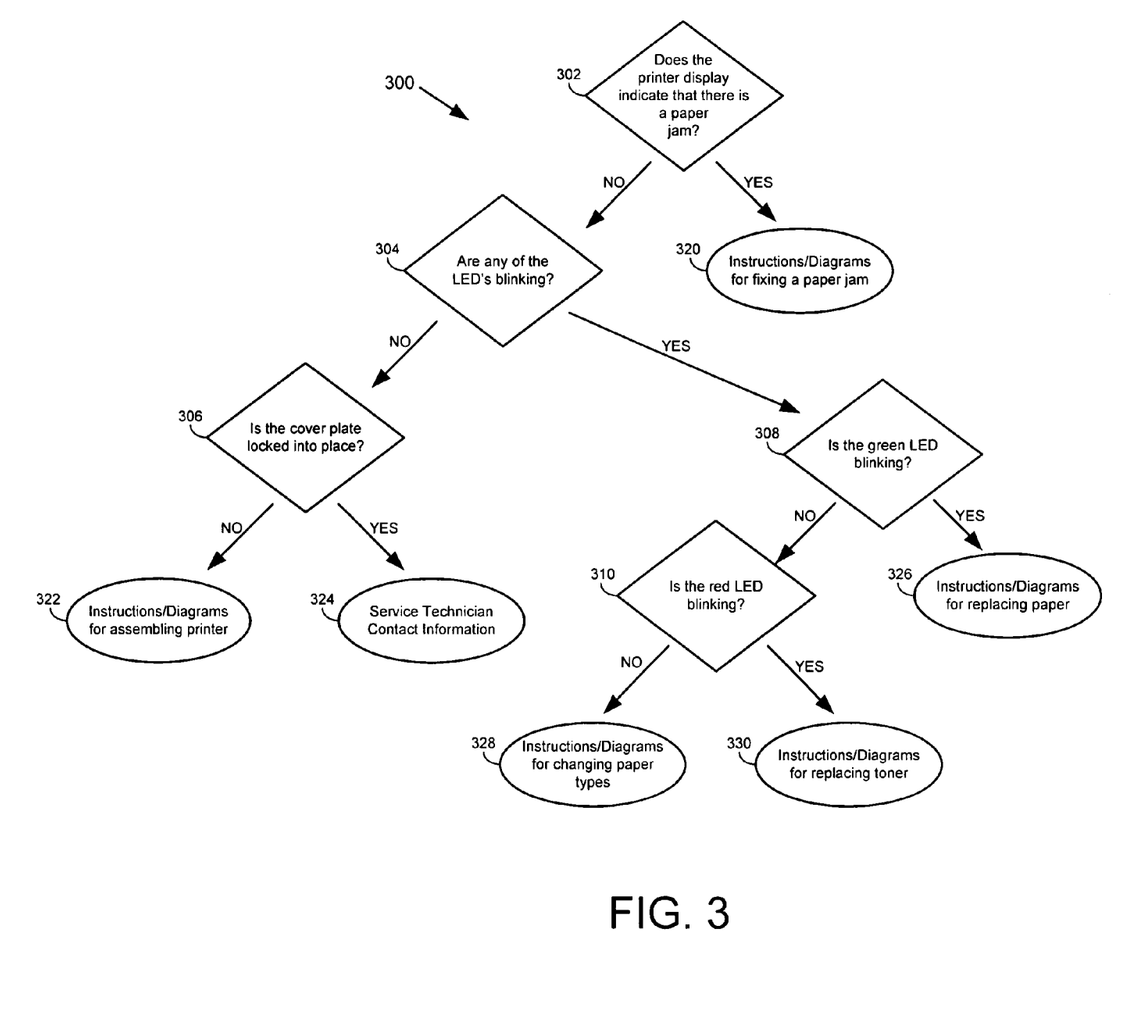
FIG. 3 is a diagram of a script that uses the format of the script model shown in FIG. 2.

FIG. 3 is a diagram of a script 300 that uses the format of the script model 200 shown in FIG. 2. During an interaction with a customer, the agent is able to use the script 300 to address the customer's problem. In this example, the customer has called the agent because the customer's computer printer is not working. The customer has a one-year service plan, and has called the agent to ask for help in fixing the printer problem.

During the interaction with the customer, the script 300 is obtained from the script repository 110 and displayed to the agent on the computing system 106 or 108. The script contains various questions 302, 304, 306, 308, and 310. The agent begins using the script 300 by asking the customer the question 302 ("Does the printer display indicate that there is a paper jam?). The customer may respond by answering either "yes" or "no". If the customer answers "yes", the document names 320 relating to instructions/diagrams for fixing a paper jam are displayed to the agent on the computing system 106 or 108. The agent may then select any one of these names to obtain a copy of the corresponding document (instructions and/or diagrams) from the knowledge repository 112. The agent may then review these documents or send them to the customer to help solve the customer's problem.

If the customer answers "no", the agent may ask the next question 304 ("Are any of the light-emitting diodes (LED's) blinking?") in the script 300. If the customer answers "no", the agent may ask the next question 306 ("Is the cover plate locked into place?"). If the customer answers "no", the document names 322 relating to instructions/diagrams for assembling the printer are displayed to the agent on the system 106 or 108. If the customer answers "yes", the document name 324 relating to contact information for a service technician is provided to the agent. The agent may either contact the service technician directly to ask for assistance or may provide the contact information to the customer.

If the customer answers "yes" to the question 304, the agent is able to ask more detailed questions to determine which particular LED is blinking. The agent first asks the question 308 to determine if the green LED is blinking on the customer's printer. If the customer answers "yes" to the question 308, the document names 326 relating to instructions/diagrams for replacing paper are displayed to the agent on the computing system 106 or 108. If the customer answers "no", the agent asks the next question 310 to determine if the red LED is blinking. If the customer answers "yes" to the question 310, the document names 330 relating to instructions/diagrams for replacing toner are displayed to the agent. If, however, the customer answers "no" to the question 310, the document names 328 relating to instructions/diagrams for changing paper types are displayed.

By using the script 300, the agent is able to attempt solving the customer's problem in a diagnostic fashion. The agent is able to ask the customer a number of different questions according to the structural flow specified by the script 300 and thereby identify documents that are useful in addressing the customer's problem.

Figure 4A:
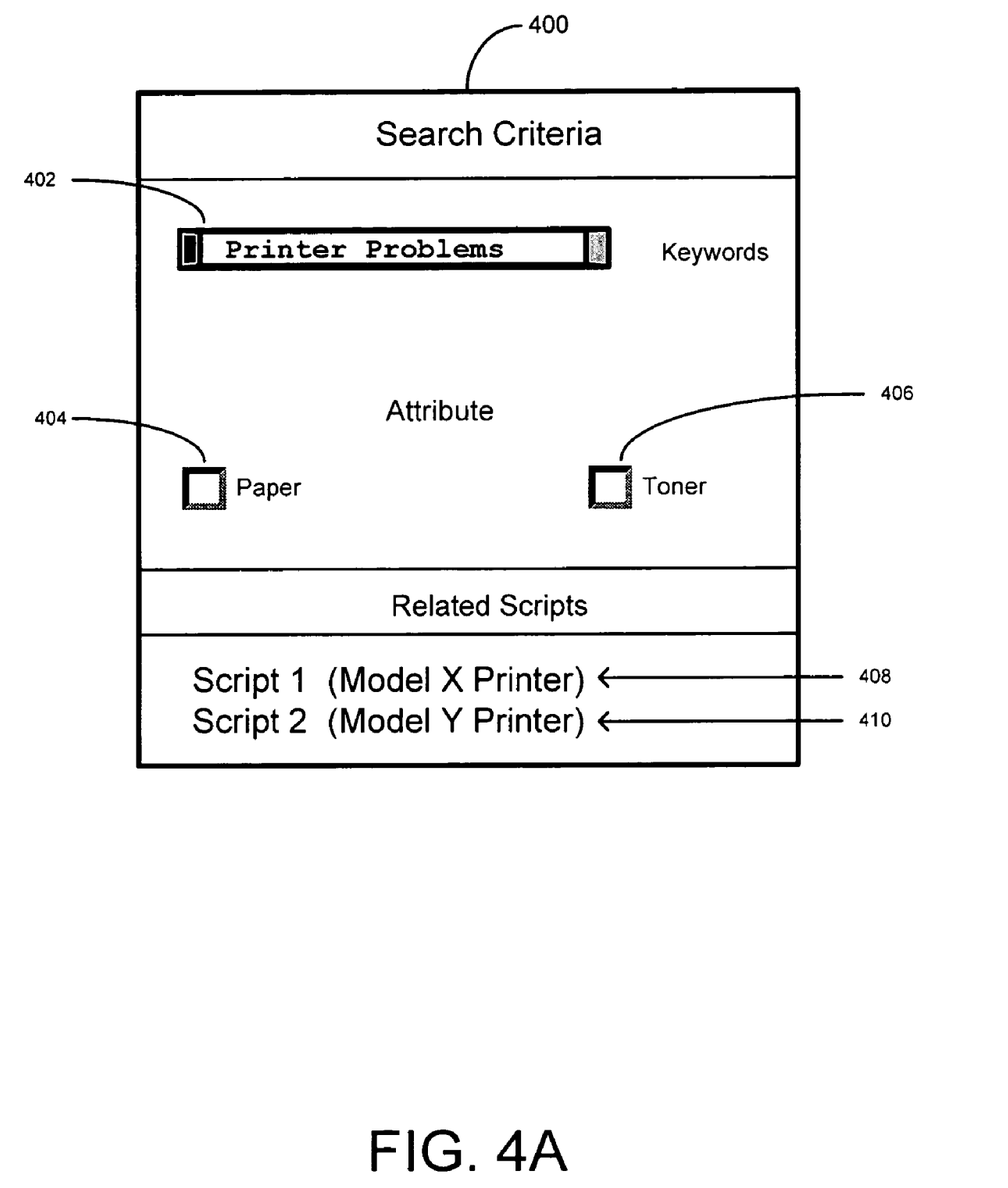
FIG. 4A is a screen diagram of a window in a graphical user interface (GUI) that may be used to specify one or more criteria to search for a script to be used during an interaction with a customer, according to one implementation.

FIG. 4A is a screen diagram of a window 400 in a graphical user interface (GUI) that may be used to specify one or more criteria to search for a script to be used during an interaction with a customer, according to one implementation. In this implementation, the window 400 is displayed to the agent in the GUI on the computing system 106 or 108. In the window 400, the agent is able to search for and select a script, such as the script 300 shown in FIG. 3, for use during an interaction with a customer. For example, using the example from above, if the customer calls the agent because of a printer problem, the agent may enter the search keywords "printer problems" into a text-entry field 402 within the window 400. In addition to specifying keyword criteria, the agent may also select one or more of the checkboxes 404 or 406 to further specify attribute criteria used when searching for scripts. The checkbox 404 specifies an attribute relating to paper problems, and the checkbox 406 specifies an attribute relating to toner problems. As shown in FIG. 4A, the agent has not selected either of the checkboxes 404 and 406.

After the agent has entered the search keywords "printer problems" into the text-entry field 402, the window 400 displays to the agent links 408 and 410 for scripts contained in the script repository 110 that are related to the specified keywords. The agent may select the link 408 to a first script, such as the script 300 shown in FIG. 3, if the customer has a "Model X" printer, and may select the link 410 to a second script if the customer has a "Model Y" printer. In one implementation, the agent determines the model of the customer's printer using information gathered during a previous interaction with the customer. In subsequent figures, it is assumed that the agent has selected the link 408 to address the customer's problem with a "Model X" printer, and that the link 408 corresponds to the script 300.

Figure 4B:
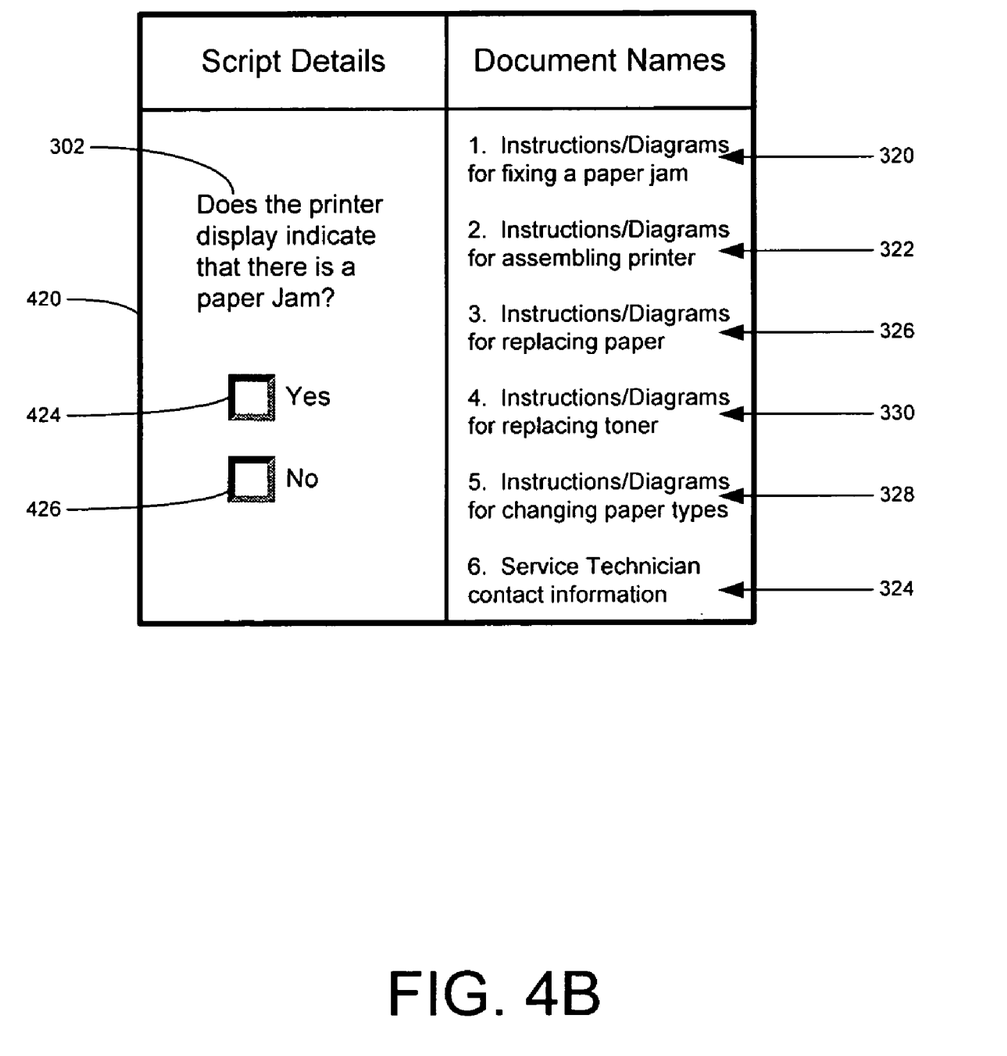
FIG. 4B through FIG. 4D are screen diagrams of windows in the GUI that display to the agent various components of the script shown in FIG. 3, according to one implementation.
Figure 4C:
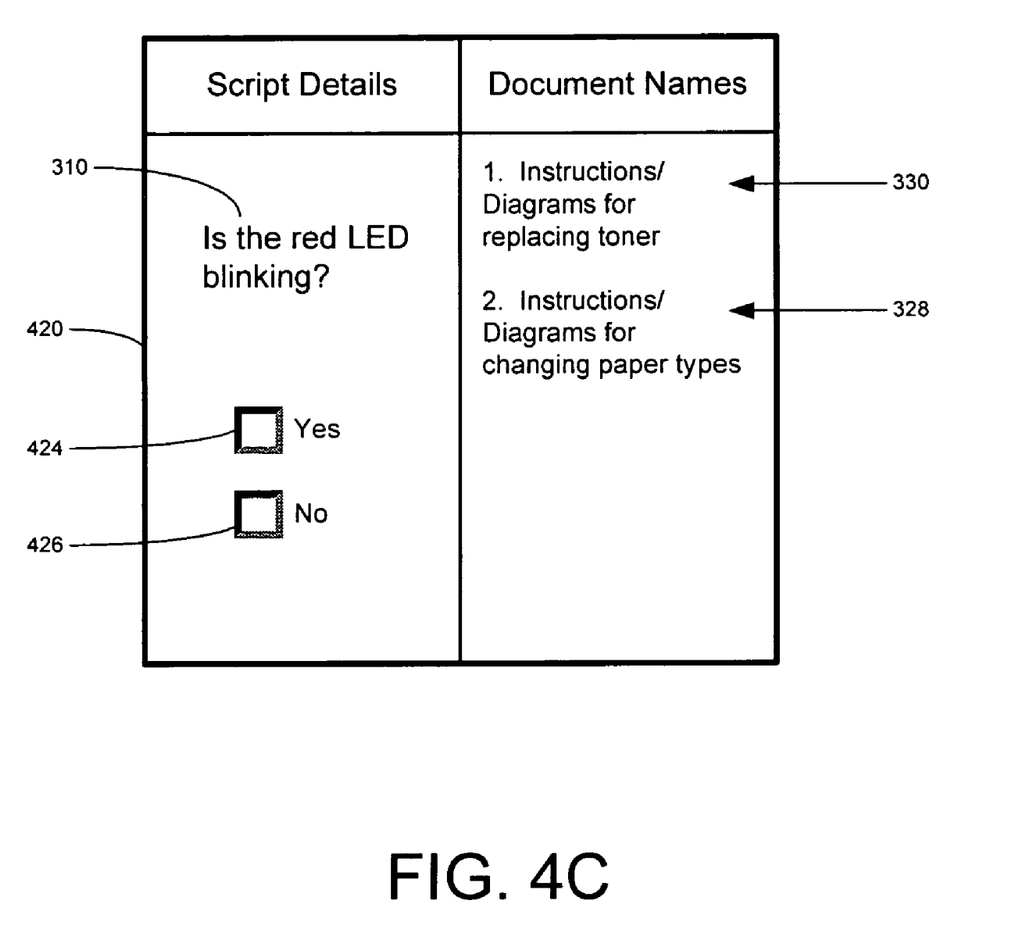
Figure 4D:
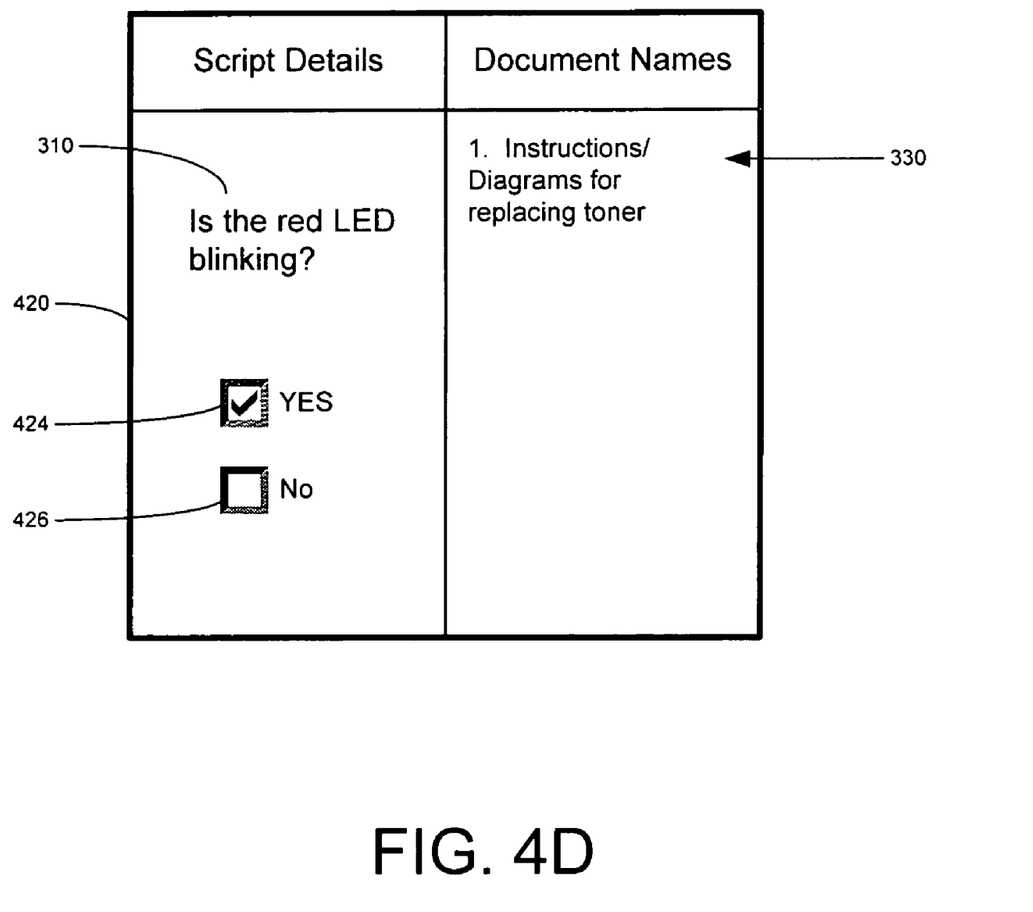

FIG. 4B through FIG. 4D are screen diagrams of windows in the GUI that display to the agent various components of the script 300 shown in FIG. 3, according to one implementation. After the agent has selected the script 300 from the list of scripts shown in the window 400 in FIG. 4A, the window 420 in FIG. 4B is displayed in the GUI on the computing system 106 or 108. The window 420 includes two columns. The left column includes the details and text for the various questions and answers of the script 300, and the right column includes the document names from the script 300 that are associated with the answers.

In FIG. 4B, the question 302 from the script 300 is displayed in the left column of the window 420. Checkboxes 424 and 426 are also displayed beneath the question 302. These checkboxes 424 and 426 correspond to potential answers to the question 302. During the interaction with the customer, the agent may ask the question 302 to the customer and select the checkbox 424 or 426 that corresponds to the customer's answer. As shown in FIG. 4B, the agent has not yet selected either of the checkboxes 424 or 426.

In the implementation shown in FIG. 4B, all of the document names 320, 322, 324, 326, 328, and 330 are displayed in the right column of the window 420. In this implementation, the document names associated with all of the potential answers within the script 300 are displayed because the agent has not yet provided an answer to the first question 302 in the script 300. As such, any of the document names 320, 322, 324, 326, 328, or 330 may apply to the customer's problem. Once the agent answers the question 302 by selecting either the checkbox 424 or 426, the list of document names shown in the right column of the window 420 will become smaller. For example, if the agent were to select the checkbox 424, the right column of the window 420 would contain only the document name 320, as per the design of the script 300 shown in FIG. 3. In one implementation (not shown), the right column of the window 420 would not include any document names if the agent has not yet provided an answer to the first question 302 in the script 300. In this implementation, document names are displayed in the right column of the window 420 only after answers that are associated with these names have been provided by the customer and selected by the agent within the window 420.

For the implementation shown in FIG. 4B, the agent is able to select any of the document names 320, 322, 324, 326, 328, or 330 in the right column of the window 420 to retrieve one or more corresponding documents from the knowledge base 114 or 116 in the knowledge repository 112. The agent is then able to read or send these documents to the customer to address the customer's printer problem.

In FIG. 4C, the window 420 displays the question 310 from the script 300. It is presumed that the agent has previously asked the questions 302, 304, and 308 to the customer, such that the customer answered "no" to the question 302, "yes" to the question 304, and "no" to the question 308. As shown in FIG. 4C, the agent has not yet selected either the checkbox 424 or 426 to provide an answer to the question 310. As such, the document names 328 and 330 are displayed in the right column of the window 420. The document names 328 and 330 are associated with each of the potential answers (i.e., "yes" and "no") to the question 310. Because the agent has not yet provided an answer based on feedback received from the customer, the documents corresponding to each of the document names 328 and 330 may be applicable and useful in addressing the customer's problem. The agent may select one or both of the document names 328 or 330 to retrieve the corresponding documents from the knowledge repository 112. For example, if the customer tells the agent that the red light is blinking, and the agent knows from previous experience that this blinking indicates a toner problem, the agent may immediately select the document name 330 without having to first select the checkbox 424. On the other hand, if the agent does not have this previous experience, the agent may select the checkbox 424. The window 420 will be updated within the GUI, as shown in FIG. 4D. As shown in FIG. 4D, only the document name 330 is displayed in the right column of the window 420. The agent may then select the document name 330 to obtain a copy of the corresponding document from the knowledge repository 112.

Figure 5:
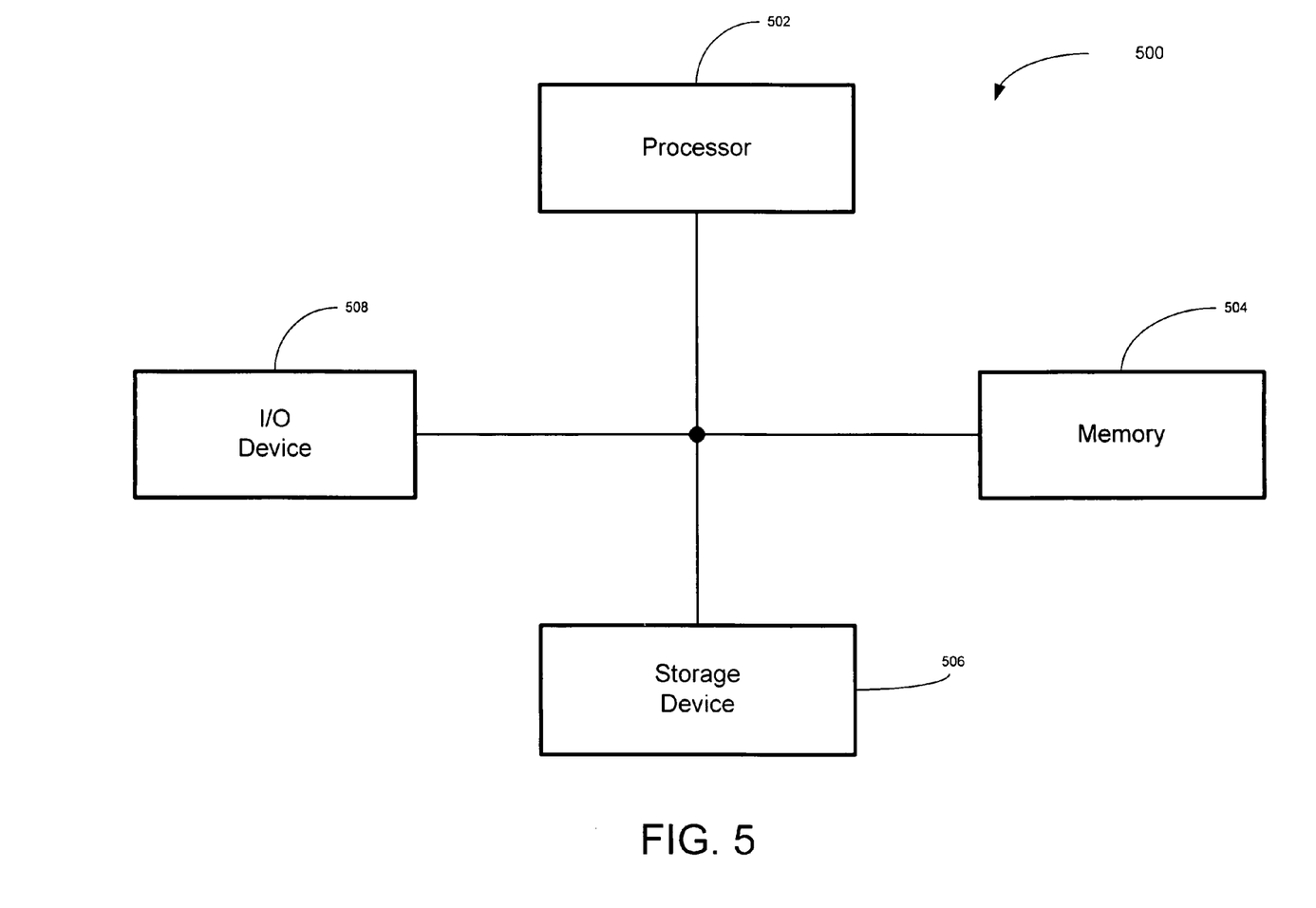
FIG. 5 is a block diagram of a computing device that may be included within the customer computing system and/or the agent computing systems shown in FIG. 1.

FIG. 5 is a block diagram of a computing device 500 that may be included within the customer computing system 102 and/or the agent computing systems 106, 108 shown in FIG. 1. The computing device 500 includes a processor 502, a memory 504, a storage device 506, and an input/output device 508. Each of the components 502, 504, 506, and 508 are interconnected using a system bus. The processor 502 is capable of processing instructions for execution within the computing device 500. In one implementation, the processor 502 is a single-threaded processor. In another implementation, the processor 502 is a multi-threaded processor. The processor 502 is capable of processing instructions stored in the memory 504 or on the storage device 506 to display graphical information for a GUI on the input/output device 508.

The memory 504 stores information within the computing device 500. In one implementation, the memory 504 is a computer-readable medium. In one implementation, the memory 504 is a volatile memory unit. In another implementation, the memory 504 is a non-volatile memory unit.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device.

In one implementation, a computer program product is tangibly embodied in an information carrier. The computer program product contains instructions that, when executed, perform one or methods, such as those described above. The information carrier is a computer- or machine-readable medium, such as the memory 504, the storage device 506, or a propagated signal.

The input/output device 508 provides input/output operations for the computing device 500. In one implementation, the input/output device 508 includes a keyboard and/or pointing device. In one implementation, the input/output device 508 includes a display unit for displaying the various GUI's on the computing systems 106 and/or 108 shown in the preceding figures.

A number of implementations have been described above. Nevertheless, it will be understood that various modifications may be made without departing from the spirit and scope of these implementations. Accordingly, other implementations are within the scope of the following claims.

What is claimed is:

1. A computer-implemented method for aiding a user in finding a solution to a problem using an interactive process, the method comprising:
(a) selecting a script of predefined questions and answers to assist a user in investigating a problem for which the user seeks a solution, the script configured so that when the user selects an answer to a question from the script, the script proceeds, based on the selected answer, to display a next question from the script;
(b) displaying to the user in a graphical user interface (GUI): (i) a first question from the selected script, (ii) first user-selectable answers from the script that are associated with the first question, and (iii) a list of multiple different electronic documents from a collection of documents associated with the script, wherein each document provides information regarding at least one unique problem, wherein each listed document is configured for the user to select the document for document retrieval, and wherein the first question, the first user-selectable answers and the list are displayed concurrently;

(c) receiving input from the user selecting one of the first user-selectable answers as a response to the first question;

(d) identifying, based on the selected answer, one or more of the multiple different electronic documents to eliminate from display in the list of electronic documents;

(e) displaying to the user in the GUI: (i) a second question from the script that is associated with the selected answer, (ii) second user-selectable answers from the script that are associated with the second question, and (iii) each remaining electronic document in the list after each identified electronic document is eliminated from the list; and (f) continuing to present questions from the script and receive answers from the user in accordance with steps (b), (c), (d) and (e) in sequence until the user chooses to retrieve an electronic document that is currently displayed in the list of electronic documents or until an end of the script is reached.

2. The method of claim 1, further comprising:
receiving input from the user selecting an electronic document from the list of documents; and
retrieving the selected electronic document from a first knowledge base.

3. The method of claim 1, wherein the interactive process is a telephone, a chat, an email, or a fax interaction.

4. The method of claim 1, wherein the first question is a closed-ended question, and wherein the answers to the first question are predefined possible answers to the closed-ended question.

5. The method of claim 1, wherein the interactive process is an interactive process between an individual and the user, and wherein the user is an interaction center agent.

6. The method of claim 5, wherein the user is a customer, and wherein the interaction is a self-service interaction.

7. The method of claim 5, wherein the user obtains the answer upon receipt of feedback from the individual.

8. A computer program product tangibly embodied in a computer-readable storage device, the computer program product including instructions that, when executed, cause a processor to perform operations for aiding a user in finding a solution to a problem using an interactive process, the operations comprising:

(a) selecting a script of predefined questions and answers to assist a user in investigating a problem for which the user seeks a solution, the script configured so that when the user selects an answer to a question from the script, the script proceeds, based on the selected answer, to display a next question from the script;

(b) displaying to the user in a graphical user interface (GUI): (i) a first question from the selected script, (ii) first user-selectable answers from the script that are associated with the first question, and (iii) a list of multiple different electronic documents from a collection of documents associated with the script, wherein each document provides information regarding at least one unique problem, wherein each listed document is configured for the user to select the document for document retrieval, and wherein the first question, the first user-selectable answers and the list are displayed concurrently;

(c) receiving input from the user selecting one of the first user-selectable answers as a response to the first question;

(d) identifying, based on the selected answer, one or more of the multiple different electronic documents to eliminate from display in the list of electronic documents;

(e) displaying to the user in the GUI: (i) a second question from the script that is associated with the selected answer, (ii) second user-selectable answers from the script that are associated with the second question, and (iii) each remaining electronic document in the list after each identified electronic document is eliminated from the list; and (f) continuing to present questions from the script and receive answers from the user in accordance with steps (b), (c), (d) and (e) in sequence until the user chooses to retrieve an electronic document that is currently displayed in the list of electronic documents or until an end of the script is reached.

9. The computer program product of claim 8, wherein the operations further comprise:
receiving input from the user selecting an electronic document from the list of documents; and
retrieving the selected electronic document from a first knowledge base.

10. The computer program product of claim 8, wherein the interactive process is a telephone, a chat, an email, or a fax interaction.

11. The computer program product of claim 8, wherein the first question is a closed-ended question, and wherein the answers to the first question are predefined possible answers to the closed-ended question.

12. The computer program product of claim 8, wherein the interactive process is an interactive process between an individual and the user, and wherein the user is an interaction center agent.

13. The computer program product of claim 12, wherein the user is a customer, and wherein the interaction is a self-service interaction.

14. The computer program product of claim 12, wherein the user obtains the answer upon receipt of feedback from the individual.

15. A system comprising:
a computing device for use by a user;
a first knowledge base coupled to the computing device, the first knowledge base containing a plurality of electronic documents;
a script repository coupled to the computing device, the script repository containing a script having a set of questions and a corresponding set of answers for each question to assist a user in investigating a problem for which the user seeks a solution;
a computer-readable storage device including instructions, where the storage device provides mass storage for the computing device; and
a processor operable to execute the instructions and perform operations, the operations comprising:
(a) selecting the script, the script configured so that when the user selects an answer to a question from the script, the script proceeds, based on the selected answer, to display a next question from the script;
(b) displaying to the user in a graphical user interface (GUI): (i) a first question from the selected script, (ii) first user-selectable answers from the script that are associated with the first question, and (iii) a list of multiple different electronic documents from a collection of documents associated with the script, wherein each document provides information regarding at least one unique problem, wherein each listed document is configured for the user to select the document for document retrieval, and wherein the first question, the first user-selectable answers and the list are displayed concurrently;

(c) receiving input from the user selecting one of the first user-selectable answers as a response to the first question;

(d) identifying, based on the selected answer, one or more of the multiple different electronic documents to eliminate from display in the list of electronic documents;

(e) displaying to the user in the GUI: (i) a second question from the script that is associated with the selected answer, (ii) second user-selectable answers from the script that are associated with the second question, and (iii) each remaining electronic document in the list after each identified electronic document is eliminated from the list; and (f) continuing to present questions from the script and receive answers from the user in accordance with steps (b), (c), (d) and (e) in sequence until the user chooses to retrieve an electronic document that is currently displayed in the list of electronic documents or until an end of the script is reached.

16. The system of claim 15, wherein the operations further comprise:
receiving input from the user selecting an electronic document from the list of documents; and
retrieving the selected electronic document from a first knowledge base.

17. The system of claim 15, wherein the interactive process is a telephone, a chat, an email, or a fax interaction.

18. The system of claim 15, wherein the first question is a closed-ended question, and wherein the answers to the first question are predefined possible answers to the closed-ended question.

19. The system of claim 18, wherein the interactive process is an interactive process between an individual and the user, and wherein the user is an interaction center agent.

20. The system of claim 18, wherein the user is a customer, and wherein the interaction is a self-service interaction.

* * * * *